Figure 1:
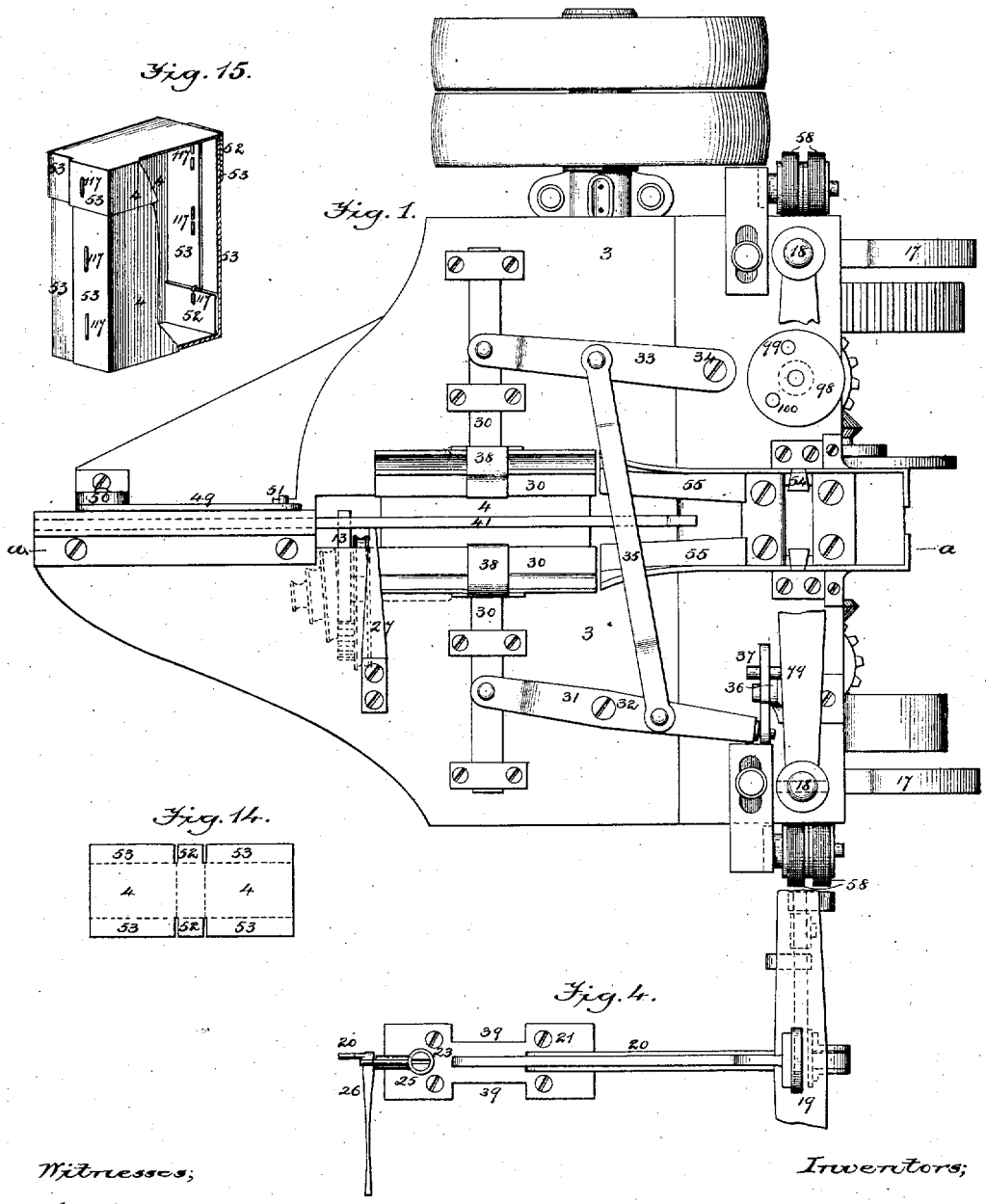

4 Sheets—Sheet 1.

H. R. HEYL & A. BREHMER.

Assignors to the NOVELTY PAPER BOX COMPANY.

Paper-Box Machine.

No. 8,020. Reissued Jan. 1, 1878.

Witnesses;

Geo. H. Graham.

J. C. Kluber.

Inventors;

Henry R. Heyl and August Brehmer by Munson & Philipp.

Attorneys.

4 Sheets—Sheet 2.

H. R. HEYL & A. BREHMER.

Assignors to the NOVELTY PAPER BOX COMPANY.

Paper-Box Machine.

No. 8,020. Reissued Jan. 1, 1878.

Witnesses

Geo. H. Graham.

J. C. Kluber.

Inventors;

Henry R. Heyl & August Brehmer by Munn & Philipp

Attorneys.

4 Sheets—Sheet 3.

H. R. HEYL & A. BREHMER.

Assignors to the NOVELTY PAPER BOX COMPANY.

Paper-Box Machine.

No. 8,020. Reissued Jan. 1, 1878.

Witnesses,
Geo. H. Graham.
J. E. Kluber,

Inventors,
Henry R. Heyl & August Brehmer,
by Munson & Philipp.
Attorneys.

H. R. HEYL & A. BREHMER.

Assignors to the NOVELTY PAPER BOX COMPANY.

Paper-Box Machine.

No. 8,020. Reissued Jan. 1, 1878.

Witnesses;
Geo. H. Graham.
J. C. Kluber

Inventors;
Henry R. Heyl & August Brehmer,
by Munson & Philipp
Attorneys.

UNITED STATES PATENT OFFICE.

HENRY R. HEYL AND AUGUST BREHMER, OF PHILADELPHIA, PENNSYLVANIA, ASSIGNORS TO THE NOVELTY PAPER BOX COMPANY.

IMPROVEMENT IN PAPER-BOX MACHINES.

Specification forming part of Letters Patent No. 132,078, dated October 8, 1872; Reissue No. 6,745, dated November 16, 1875; Reissue No. 7,401, dated November 28, 1876; Reissue No. 8,020, dated January 1, 1878; application filed June 16, 1877.

*To all whom it may concern:*

Be it known that we, HENRY R. HEYL and AUGUST BREHMER, both of the city and county of Philadelphia, in the State of Pennsylvania, have invented a Machine for Making Boxes of Paper, Pasteboard, and other Material, of which the following is a specification:

The machine is intended, primarily, for making boxes of paper or pasteboard without cement, the fastening being effected by wire staples, which are produced and applied by the machine which forms the boxes. It will obviously, however, fasten material together by wire staples driven through and clinched upon the under side of the same, whether such material is in the form of a box or not.

In forming boxes the box-blanks are placed in a receptacle provided with a sliding platform, which is drawn up by a weight and cord applied to a fusee-pulley, adapted to graduate the power of the weight to correspond with the number, and consequent weight, of the blanks remaining in the receptacle. The weight-pulley is detained by a ratchet, which prevents the drawing up of the sliding platform, excepting when the said ratchet is retracted. The blanks are taken, one by one, from the top of the pile by a pneumatic or suction feeder, provided with automatic valves to adapt it to seize and drop the blanks at the proper moments. The said feeder, in its descent, retracts the detent-ratchet, and receives a slight upward pressure from the pile of blanks. As the feeder rises again with one blank the detent, being released, catches the weight-pulley, so that, whether the quantity of blanks be greater or less, the top of the pile always rests at one level to receive the feeder. The blank, being deposited on a table by the feeder, is carried forward by a follower to a position over the mold, into which it is forced by a plunger, the bottom flaps being first bent up and the end flaps next folded over them as the plunger descends. This plunger is also the clincher-stock, and constitutes the work-support during the operations of inserting and clinching the staples. The wire to form staples is, in continuous lengths, contained on reels equal in number to the staples used in each box. The wires being fed forward by rollers at each stroke of the machine, the necessary length to form a staple is cut from each wire by a cutting-punch, which is bifurcated, so as to form a bending-fork, working over a transverse forming-mandrel, around which the wire is bent into the form of a staple by the pressure of the said bending-fork. The bending-fork is formed with internal longitudinal grooves, which receive the staple as it is formed, and hold it securely while it is carried or presented by the motion of the bending-fork to the proper position to be driven. The forming-mandrel then recedes, and the staple is driven through the lapped sides of the box by a hammer or driving-rod moved longitudinally within the bending-fork.

Cavities in the plunger or clincher-stock receive inwardly-projecting ends of the staple, which ends are then bent in opposite directions, either toward or away from each other, by clinchers, while the head of the staple is still held by the hammer or driving-rod. The plunger or clincher-stock is then withdrawn, and its descent with a new box discharges that which was previously formed.

The various parts are made changeable or adjustable, to adapt them for the manufacture of boxes of various sizes, forms, or thickness of material.

Figure 2:
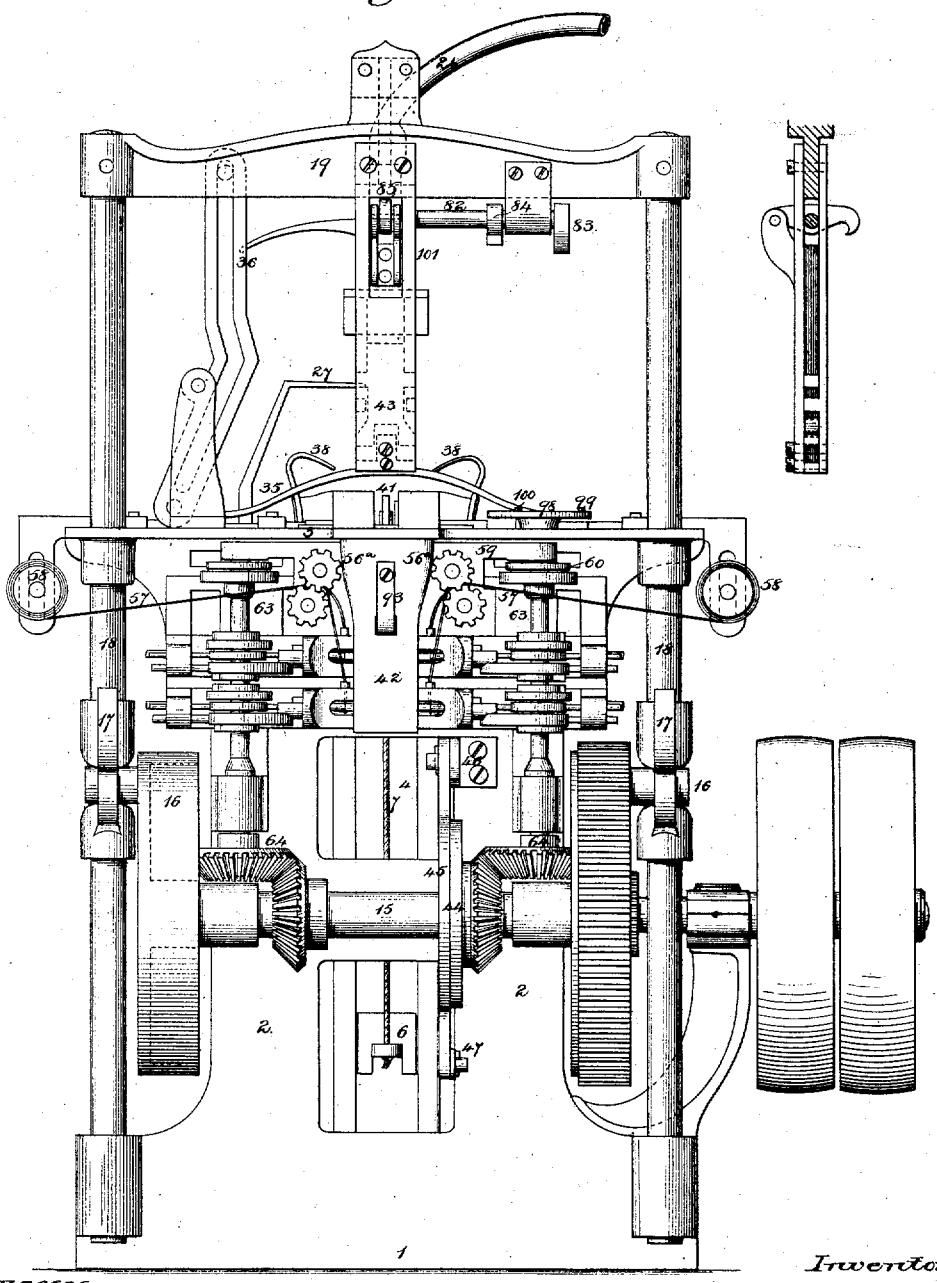
Figure 3:
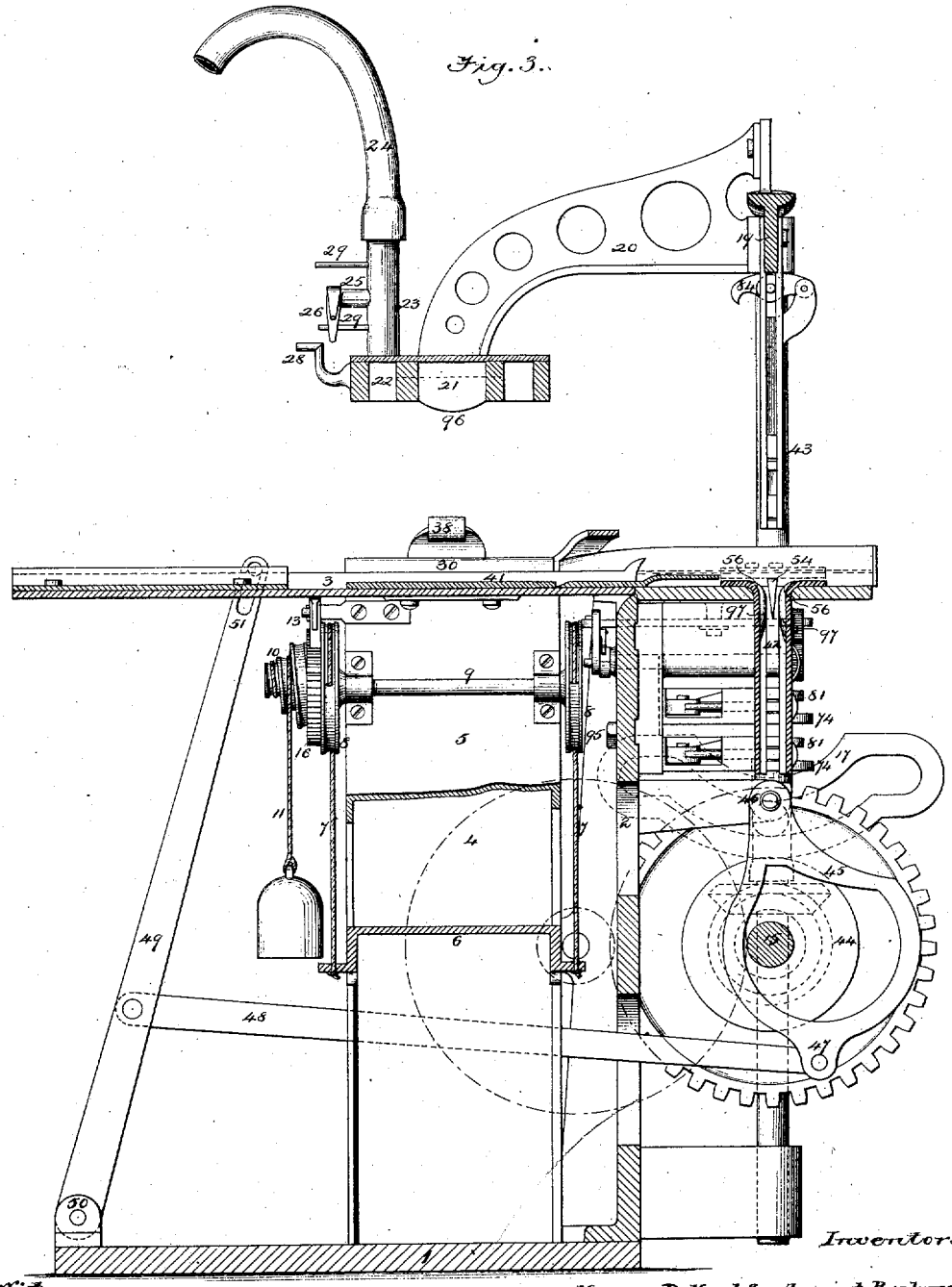
Figure 5:
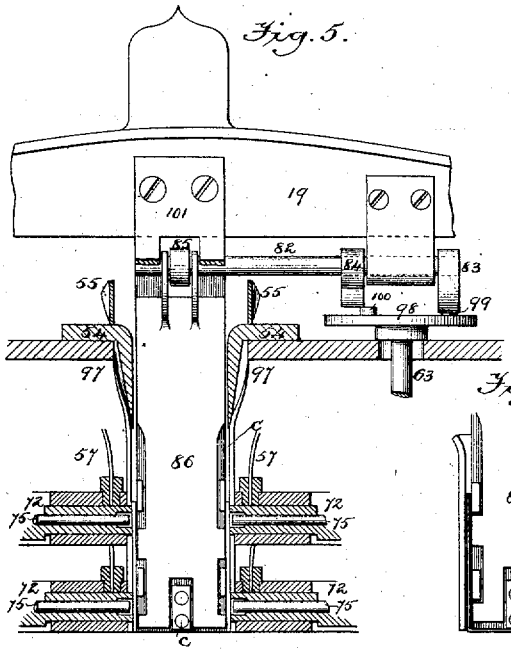
Figure 6:
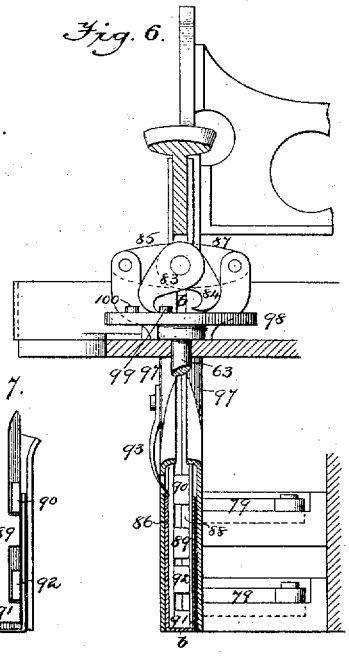
Figure 7:
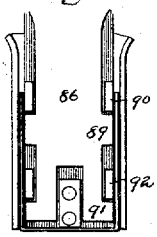
Figure 8:
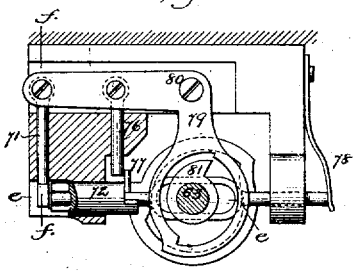
Figure 11:
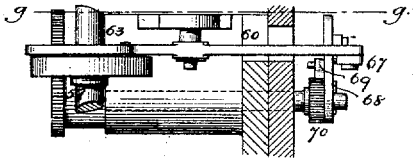
Figure 9:
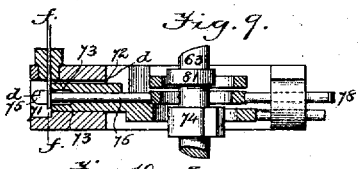
Figure 12:
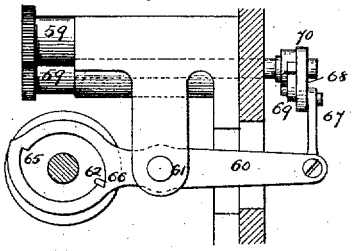
Figure 10:
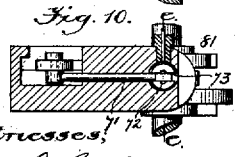
Figure 13:
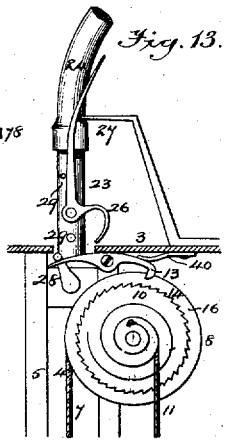

In the accompanying drawing, Figure 1 is a plan or top view of a machine illustrating the invention, with some of the upper works omitted. Fig. 2 is a front elevation. Fig. 3 is a vertical section at *a a*, Fig. 1. Fig. 4 is a plan of the upper part, omitted in Fig. 1. Fig. 5 represents a vertical section of the box-mold at *b b*, Fig. 6, and an elevation of the plunger or clincher-stock that works therein, as hereinafter described. Fig. 6 is a vertical section of the same parts in the same position, in the plane indicated by the line *c c*, Fig. 5. Fig. 7 is a section at *b b*, Fig. 6, showing the parts in a different postion. Fig. 8 is a horizontal section at *d d*, Figs. 9 and 10, of the devices employed to cut the wire and form and drive staples to fasten the parts of the box together. Fig. 9 is a vertical section of the same at *e e*, Figs. 8 and 10. Fig. 10 is a vertical section thereof at *f f*, Figs. 8 and 9. Fig. 11 is a sectional elevation of the mechanism employed for feeding the wire. Fig. 12 is a horizontal section of the same at *g g*, Fig. 11. Fig. 13 is a sectional elevation of the blank-feeding apparatus hereinafter described, and Fig. 14 is a plan of a box-blank. Fig. 15 is a perspective view of a box.

The main frame of the machine consists of a bed-plate, 1, standards 2, and table 3, of proper construction to support and afford bearings for the various working parts. The box-blanks 4 4 consist of simple rectangular pieces of paper or other material, which may be cut without waste, and are prepared by slitting, as shown in Fig. 14, to separate the end flaps from the bottom flaps. The box-blanks, before being placed in the machine, may be slightly bent into convex form, to facilitate the separation of the uppermost one, as hereinafter described. Any desired number of these blanks are placed in a vertical pile within a receptacle, 5, resting on a sliding platform, 6, which platform is drawn up, as fast as the blanks are removed, by elevating-cords 7 7, passing over pulleys 8 8, attached to a shaft, 9, upon which is also keyed a fusee-pulley, 10, carrying a cord, 11, from which is suspended a weight, 12. These parts are so constructed and arranged that the weight 12 will more than counterbalance the box-blanks resting on the sliding platform 6; and as the reduction of the pile of blanks permits the weight 12 to descend, the cord 11, reaching a smaller part of the fusee 10, will act with less leverage on the elevating-cords 7, and hence the upward pressure of the platform 6 may be graduated approximately in proportion to the weight of the box-blanks resting thereon. 13 is a detent-pawl, engaging with a ratchet-wheel, 14, to prevent the elevation of the platform 6, excepting at proper periods, when the detent is retracted. The arrangement of the parts is such as to cause the top of the pile of blanks, whether the pile be large or small, to be kept at about the same distance below the level of the table 3, as will be presently explained. 15 is the main driving-shaft, with cranks 16 16, which work in yokes 17 17 on rods 18 18, attached at top to a cross-head, 19, carrying a horizontal arm, 20, to which is attached the feeder 21. This feeder is formed with air-passages 22 in its under side, communicating with a nozzle, 23, to which is attached a loose or flexible tube, 24, connecting with an air-pump, or any suitable exhaust apparatus. Within the nozzle 23 is a throttle-valve, 25, controlled by a bell-crank tappet, 26, one end of which, as the feeder 21 descends and presses on the topmost blank 4, strikes a stud, 27, and is moved so as to open the valve. The air is thus exhausted from within the feeder. At the same time a stud, 28, on the feeder 21 strikes the heel of the detent-pawl 13, retracting it from the ratchet-wheel 14, and releasing the weight 12, so that it will cause the platform to rise and press the blanks up against the feeder as the latter ascends, and to elevate the pile of blanks until the stud 28 releases the pawl 13, when the latter instantly catches the ratchet-wheel 14, and prevents the blanks from rising farther. The topmost blank, being held by atmospheric pressure against the face of the feeder, will be drawn up with it from the pile. The feeder may have one or more of the air-passages 22 communicating with the exhaust-tube 24, and one or more of the projections or ridges 96, Fig. 3, placed between the air-passages 22, or on one or both sides of a single air-passage. The illustration shows air-passages at the ends of the feeder, and a projecting ridge between them. We have used, with good effect, a central air-passage and ridges at the ends. The edges or margins of the air-passages 22 have flat faces, giving them an effective hold on the blank, and the projection or projections 96, by depressing another part of the blank, prevent more than one blank following it. 29 29 are pins upon the feeder, to limit the movement of the valve-tappet 26 in either direction. (See Figs. 3 and 13.) Upon the table 3, directly over the blank-receptacle, is a pair of sliding plates, 30 30, which recede from each other as the feeder descends, and remain apart until the feeder has ascended with a blank, when the plates again close over the blank-receptacle and receive the blank, which drops from the feeder 21 as soon as the valve 25 is closed by the lower end of the tappet 26 striking the arm 27. The movement of these sliding plates is produced by levers 31 and 33, the former being fulcrumed at its center 32, and the latter at one end, 34, and the two being connected by a rod, 35. The forward end of the lever 31 is jointed to a vertical lever, 36, which is fulcrumed to a stationary standard on the frame, and is operated by a stud, 37, on the cross-head 19 working in a slot in said lever 36. Lips 38, Figs. 1, 2, and 3, attached to the sliding plates 30, and projecting over the same within recesses 39, Fig. 4, in the sides of the feeder 21, insure the deposit of the blanks from the bottom of the feeder onto the plates 30. A spring, 40, is applied to the detent-pawl 13, to cause it to act promptly in arresting the motion of the shaft 9. The box-blank being deposited on the sliding plates 30, a sliding rod, 41, is moved forward, carrying the blank centrally over the mold 42, and beneath the plunger or clincher-stock 43, projecting downward from the center of the cross-head 19. The sliding rod 41 is then instantly drawn back.

The motions of this sliding rod are effected by a cam, 44, on the main driving-shaft 15, working in a yoke-lever, 45, fulcrumed at 46 to the stationary frame, and jointed at 47 to the forward end of a connecting-rod, 48, the rear end of which is jointed to a vertical lever, 49, which latter is fulcrumed at its lower end, 50, to the stationary frame, and at its upper end, 51, is jointed to the rear end of the rod 41. 55 55 are guide-plates, projecting upward sufficiently to conduct the blanks over the elevated bottom-flap folders 54 54. Upon the descent of the cross-head 19 it causes the plunger or clincher-stock 43 to carry the blank down into the mold 42, in which the box is formed. This mold consists of two bottom-flap folders and two end-flap folders, the latter having two inclined flanges, each arranged so as to fold the box-blank around the plunger or clincher-stock as the latter descends into the mold. The bottom-flap folders 54 54 are elevated a little above the others, so that the plunger or clincher-stock first forces the box-blank between them in its downward movement, thereby folding the bottom flaps 52 52 up against the sides of the plunger or clincher-stock. Then, as the plunger or clincher-stock descends still farther, the box-blank is forced between the side folders 56 56, which causes the sides of the box-blank 4 4 to also fold up against the plunger or clincher-stock. The next operation consists of folding the end flaps 53 53 around the plunger or clincher-stock and over the bottom flaps 52 52, which latter are still held against the plunger or clincher-stock by the long points of the folders 54 54 until the end flaps 53 53 are folded around sufficiently to retain the bottom flaps 52 52 in place. This folding of the end flaps 53 53 is done by the inclined flanges 97 97, projecting from the side folders 56 56 at each corner of the mold. These flanges are so narrow that they do not extend across or overlap each other, but project only a short distance around the ends of the box, leaving space enough between each opposite pair to admit the passage of the mechanism that inserts the wire staples through the box sides or the flaps forming the same. The flanges gradually assume a right angle with the side folders as they approach the bottom, so that, when the box is clear down into the mold, the flaps 53 53, which form the ends of the box, are bent around in position to receive the wire staples. Each one of the pair of opposite flanges is so inclined in relation to its fellow that the side flaps are folded around at the same time when their edges are intended to meet flush, or one flange should be inclined a little in advance of the other if the side flaps are intended to overlap each other, as is the case in the form of box here represented.

The box is now completely shaped, and is supported upon the plunger or clincher-stock in a proper position to receive its staple-fastenings. The plunger or clincher-stock has also been moved into its proper position relative to the staple presenting and inserting mechanisms to insure the co-operation of the presenting, inserting, and clinching mechanisms in securing the staples in the material. The wire 57, from which the staples are made, is wound in continuous lengths on reels 58 58, Figs. 1 and 2, from which it is drawn by feed-rollers 59 59, driven intermittingly by the mechanism shown in Figs. 11 and 12. This mechanism consists of a horizontal yoke-lever, 60, fulcrumed at its center, 61, and inclosing a wrist-pin, 62, on the vertical shaft 63, driven by bevel-pinions 64. (See Fig. 2.) The yoke of the lever 60, in which the wrist-pin 62 works, is formed with two shoulders, 65 66, with which the said wrist-pin engages alternately to move the lever in opposite directions. No effect is produced on the lever while the pin passes over the curves between the shoulders. A connecting-rod, 67, at the free end of the lever 60, is jointed to an arm, 68, carrying a pawl, 69, which engages with a ratchet-wheel, 70, on one of the roller-shafts, the two rollers of each pair being geared to turn together.

It will thus appear that each forward movement of the lever imparts a slight rotary movement to the feed-rollers, and the parts are so constructed and proportioned that each movement will feed forward a length of wire sufficient to form a staple.

One pair of feed-rollers, with their operating mechanism, may, as represented, feed all the wires used on one side of the machine.

The operation of cutting, forming, presenting, driving, and clinching will be described with reference to a single staple, it being understood that this operation may be performed simultaneously in two, four, six, or even more places, according to the dimensions of the box which the machine is at the time employed to make.

The drawing shows mechanism for applying four staples — two on each side. The mechanism for cutting, forming, presenting, and driving the staples is shown in Figs. 8, 9, and 10. A proper length of wire is severed and bent around a square forming-mandrel, 71, by a hollow cutting-punch or bending-fork, 72, formed to pass transversely over the forming-mandrel 71, and having in its interior longitudinal grooves 73, Figs. 9 and 10, which receive the wire as it is bent around the forming-mandrel to form a staple, and hold the said staple in proper position to be presented to the work, and for driving.

The reciprocating movement of the hollow cutting-punch or bending-fork 72 is imparted by a cam, 74, upon the shaft 63, and its operation is such that it bears upon and compresses the material, and guides the staple it contains while it is being presented and driven, and is then retracted. It thus directs the staple-legs in lines parallel with its internal grooves, and guides them so that they will be presented to and protruded through the material in proper relation to the clinching mechanism.

Within the bending-fork or cutting-punch 72 is a reciprocating hammer or driving-rod, 75, held back by a pin, 76, which engages a pin, 77, projecting from the hammer or driving-rod 75, and which, when released by the retraction of the pin 76, is driven forward by a spring, 78. The forming-mandrel 71 and pin 76 are both attached to a crank-lever, 79, fulcrumed at 80, and moved back and forth by a cam, 81, on the shaft 63. As soon as the motion of this lever withdraws the forming-mandrel 71 from before the staple, the latter being still held in position by the grooves 73, the pin 76 releases the pin 77, permitting the spring 78 to drive the hammer 75 forward with a sharp percussion on the staple, driving it through the two or three thicknesses of paper, and thus connecting the laps of the box. The hammer or driving-rod rests upon the head of the staple with a force, exerted by its propelling-spring 78, sufficient to hold the staple in place and compress the material to be united thereby while the clinchers operate to bend down the staple-legs. The legs of the staples are securely held and guided by the longitudinal grooves in the bending-fork or cutting-punch 72, so as to prevent their bending while the staple is being presented to and driven through the paper, and to guide them in the proper relative position to the clinching mechanism for its operation upon them. The ends of the staples are received in suitable cavities in the edges of the plunger or clincher-stock 43. The mechanism for clinching or bending over the ends of the staples is represented in Figs. 5, 6, and 7, and consists of plates carrying legs or jaws 89 90 91 92, which plates slide between fixed plates 101, which constitute the plunger or clincher-stock. Figs. 5 and 6 show the positions of the parts when the staples are driven and before they are clinched. Fig. 7 shows the position when they are clinched. On the head of the vertical shaft 63 is a disk or wheel, 98, from the upper surface of which project two pins, 99 and 100, which operate a rock-shaft, 82, mounted horizontally in bearings under the cross-head. This rock-shaft has a pair of tappets, 83 and 84, on which the pins 99 and 100 act successively. Upon the shaft 82 are rigid arms 85 87, projecting in opposite directions, and respectively connected to sliders 86 and 88, which two sliders constitute the plunger or clincher-stock 43. 89 and 91 represent horizontal lugs or jaws on the slider 88. These lugs or jaws are arranged alternately, as represented, so that the motion of the shaft 82 in one direction, by depressing the slider 86 and elevating the slider 88, moves the two lugs or jaws 89 and 90 toward each other and the two lugs or jaws 91 and 92 toward each other.

As soon as the downward stroke of the cross-head 19 has formed the box within the mold, and the staple has been driven, in the manner explained, with its legs resting between the lugs 91 and 92, the rotation of the shaft 63 throws the pin 99 against the tappet 83, rocking the shaft 82 in one direction, bringing together the pair of lugs 91 92, so as to bend the two legs of the staple toward each other, flat against the surface of the material, and effectually secure them without the necessity of subsequent hammering. This position of the parts is shown in Fig. 7. The subsequent contact of the pin 100 with a tappet, 84, rocks the shaft in the other direction, so as to open or separate the lugs in readiness for the next operation. A spring, 93, catching over the top of the box, prevents it rising with the plunger or clincher-stock, and when the plunger or clincher-stock again descends with a new blank, the previously-finished box is expelled through the bottom of the mold.

A modification in the construction of the plunger or clincher-stock is illustrated in Fig. 2. In this case the body of the plunger or clincher-stock is made in one piece, with a single slider working in it. The motion of the shaft in one direction throws down this slider to bend down the upper part of each staple, and the reverse motion opens the cavity, as before. This opening of the cavity is performed directly before the action of the hammer or driving-rod 75, and is followed by the clinching action just described. The elevation of the plunger or clincher-stock itself then bends up the lower member of each staple, and thus completes the clinching action. The plunger or clincher-stock which supports the work is connected at one end only with its support, and the staple forming, presenting, and inserting mechanisms are carried in a head supported by the main frame in such relation to the plunger or clincher-stock that there is provided a free passage for the material operated upon in a plane parallel with the surface of the clincher-stock, and between it and the stapling mechanism. This construction facilitates the presentation and removal of the work, and it also admits of the introduction of the clinching mechanism into a box to clinch a staple on the inside of such hollow articles. The heads which carry the staple forming and inserting mechanisms are supported in ways 94 in the faces of the standards 2 of the frame-work. In these ways the said heads are adjustable, by means of set-screws 95, to and from the plunger or clincher-stock which supports the work, and thus adjust the staple forming and inserting mechanisms in such relation to the staple-clinching mechanisms as to adapt the machine for operation upon different thicknesses of work.

This machine is adapted for inserting two or more staples at different points of the material, in order that the staples may be inserted at different distances apart.

The following is claimed as new:

1. The blank-receptacle and graduated counterbalanced platform, combined and arranged substantially as herein described, to elevate the blanks, as required, with a force varied proportionally to the height of the pile of blanks.

2. The detent 13 14 and automatic device for temporarily releasing the same, substantially as set forth.

3. The feeder 21, constructed with one or more air-passages in its face, connected with a pipe for exhausting the air, in combination with the valve or valves operated by the descent and ascent of the feeder, by mechanism substantially as herein described.

4. In combination with staple forming and inserting mechanism, a work-support attached at one end to the machine and provided near its free end with a staple-clinching mechanism, substantially as shown and described.

5. In combination with a forked or hollow staple guiding, supporting, and presenting mechanism, and staple-inserting mechanism operating within the same, two clinchers operating to bend the projecting legs of a staple down onto the material, and at angles toward each other, substantially as shown and described.

6. The combination of a bending-fork or hollow staple-presenting device, having interior longitudinal grooves to support and guide the staple when driving, with a pair of clinching-jaws, the co-operation being such that the staple is inserted through the material in proper relation to the clinching mechanism, substantially as shown and described.

7. The combination of the bending-fork or hollow staple-presenting device with a reciprocating hammer or driving-rod, operating by percussion to drive the staple in the process of inserting it through the material, substantially as shown and described.

8. In combination with staple-clinching mechanism, operating to bend the two projecting legs of a staple at angles toward each other, the grooved bending-fork, operating to compress the material, and a reciprocating driver, their co-operation being such that in the process of driving the staple the material is clamped and the staple-legs are forced through it in such a position relative to the clinching mechanism as to be properly clinched thereby, substantially as shown and described.

9. A reciprocating hammer or driving-rod, operating, in conjunction with an automatic staple-presenting mechanism, to insert a staple, and, by pressure upon its head, to hold and compress the material to be united thereby while the clinchers operate to bend down and clinch the staple-legs upon the compressed material, substantially as shown and described.

10. In combination with a staple-inserting mechanism, a clincher-stock or work-support, automatically moved to and from said staple-inserting mechanism to carry the work and present the staple-clinching mechanism in position for co-operation with said staple-inserting mechanism, substantially as shown and described.

11. In combination with the automatic staple-presenting mechanism provided with internal staple-guiding grooves, clinching-jaws so constructed and operated that they shall stand apart to receive the legs of the inserted staple between them, and be closed together to bend the staple-legs toward each other and down onto the material, substantially as described.

12. In combination with a work-support, a head supporting the staple-inserting mechanism, constructed so as to be adjustable to and from the said support, substantially as described.

13. The combination of a staple supporting and presenting mechanism, having guiding grooves or channels, and a staple-inserting mechanism operating in said grooves or channels, with a staple-clinching mechanism, all substantially as described.

In testimony whereof we have hereunto set our hands in the presence of two subscribing witnesses.

HENRY R. HEYL.
AUGUST BREHMER.

Witnesses:
GEO. L. PFOUTS,
WM. C. STROMSON.